United States Patent
Tang et al.

(10) Patent No.: US 11,250,248 B2
(45) Date of Patent: Feb. 15, 2022

(54) RECOGNITION METHOD AND APPARATUS AND MOBILE PLATFORM

(71) Applicant: SZ DJI TECHNOLOGY CO., LTD., Shenzhen (CN)

(72) Inventors: Ketan Tang, Shenzhen (CN); You Zhou, Shenzhen (CN); Guyue Zhou, Shenzhen (CN); Zhuo Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/553,680

(22) Filed: Aug. 28, 2019

(65) Prior Publication Data
US 2019/0392205 A1    Dec. 26, 2019

Related U.S. Application Data

(63) Continuation of application No. PCT/CN2017/075193, filed on Feb. 28, 2017.

(51) Int. Cl.
| G06K 9/00 | (2006.01) |
| G06T 7/55 | (2017.01) |
| G06T 7/246 | (2017.01) |
| G06K 9/46 | (2006.01) |

(52) U.S. Cl.
CPC ....... G06K 9/00355 (2013.01); G06K 9/4604 (2013.01); G06T 7/246 (2017.01); G06T 7/55 (2017.01); G06T 2207/10028 (2013.01); G06T 2207/30196 (2013.01)

(58) Field of Classification Search
CPC .... G06K 9/00355; G06K 9/4604; G06T 7/55; G06T 7/246; G06T 2207/10028; G06T 2207/30196

USPC ......................................................... 382/103
See application file for complete search history.

(56) References Cited

U.S. PATENT DOCUMENTS

| 2012/0062736 | A1* | 3/2012 | Xiong | G06K 9/00389 348/143 |
| 2013/0034265 | A1* | 2/2013 | Nakasu | G06K 9/00355 382/103 |
| 2015/0253864 | A1* | 9/2015 | Parkhomenko | G06F 3/017 345/156 |

FOREIGN PATENT DOCUMENTS

| CN | 103984928 A | * | 8/2014 |
| CN | 103984928 A | | 8/2014 |
| CN | 105138990 A | | 12/2015 |
| CN | 105389539 A | | 3/2016 |
| EP | 2365420 A2 | * | 9/2011 ......... G06K 9/00355 |

(Continued)

OTHER PUBLICATIONS

Liu, X., Fujimura, K. Hand gesture recognition using depth data. Sixth IEEE International Conference on Automatic Face and Gesture Recognition, 2004. Proceedings., Seoul, South Korea, 2004, pp. 529-534, doi: 10.1109/AFGR.2004.1301587. (Year: 2004).*

(Continued)

*Primary Examiner* — Nay A Maung
*Assistant Examiner* — Daniella M. DiGuglielmo
(74) *Attorney, Agent, or Firm* — Anova Law Group, PLLC

(57) ABSTRACT

The present disclosure provides a gesture recognition method. The method includes the following steps: acquiring a depth image of a user; determining a point set of a two-dimensional image indicating a palm based on a depth information of the depth image; and, determining a gesture based on the point set.

20 Claims, 6 Drawing Sheets

(56) References Cited

FOREIGN PATENT DOCUMENTS

| WO | WO-2014009561 A2 * | 1/2014 | ........... G06F 3/0304 |
| WO | 2014009561 A3 | 5/2014 | |

OTHER PUBLICATIONS

Qin, S., Zhu, X., Yang, Y. et al. Real-time Hand Gesture Recognition from Depth Images Using Convex Shape Decomposition Method. J Sign Process Syst 74, 47-58 (2014). https://doi.org/10.1007/s11265-013-0778-7. (Year: 2014).*

The World Intellectual Property Organization (WIPO) International Search Report for PCT/CN2017/075193 dated Dec. 1, 2017 6 pages.

* cited by examiner

RECOGNITION METHOD AND APPARATUS AND MOBILE PLATFORM

CROSS-REFERENCE TO RELATED APPLICATION

This application is a continuation application of International Application No. PCT/CN2017/075193, filed on Feb. 28, 2017, the entire content of which is incorporated herein by reference.

TECHNICAL FIELD

The present disclosure relates to the field of image processing, more specifically, to a recognition method and apparatus and a mobile platform.

BACKGROUND

Gesture recognition is the recognition of a user's gesture, such as the shape of a hand or a movement of the palm. Gesture recognition is typically performed using structured light measurement, multi-angle imaging, and Time-of-Flight (TOF) cameras. In particular, the TOF camera is widely adapted in gesture recognition due to its low cost and ease of miniaturization. However, due to the low resolution of the depth image acquired by the TOF cameras and the low data acquisition frame rate of the TOF cameras, the accuracy of the recognition is not optimal when the TOF camera is used to perform gesture recognition, especially when a TOF camera is used in a mobile platform to perform gesture recognition.

SUMMARY

The present disclosure provides a recognition method and apparatus and a mobile platform to improve the accuracy of gesture recognition.

One aspect of the present disclosure provides a gesture recognition method. The method includes the following steps: acquiring a depth image of a user; determining a point set of a two-dimensional image indicating a palm based on depth information of the depth image; and, determining a gesture based on the point set.

Another aspect of the present disclosure provides a gesture recognition device. The gesture recognition device includes a TOF camera for acquiring a depth image of a user; and a processor for determining a point set of a two-dimensional image indicating a palm based on depth information of the depth image, and determining a gesture based on the point set.

The embodiments of the present disclosure provide a hand gesture recognition method and apparatus and a mobile platform that may recognize a user's gesture by acquiring a depth image of a user. In particular, when the resolution of the depth image acquired by the TOF camera is low, the user's palm may be accurately extracted from the depth image. At the same time, when the frame rate of the TOF camera is low, a motion trajectory of the user's palm may be accurately extracted, thereby accurately recognizing the user's gesture. In addition, based on the recognized gesture, a control instruction corresponding to the gesture may be generated, and the control instruction may be used to control the mobile platform, thereby simplifying the control operation of the mobile platform, enriching the control manner of the mobile platform, and further improving the enjoyment in controlling the mobile platform.

BRIEF DESCRIPTION OF THE DRAWINGS

To describe the technical solutions in the embodiments of the present invention more clearly, the following briefly introduces the accompanying drawings needed to describe the embodiments of the present disclosure. The accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
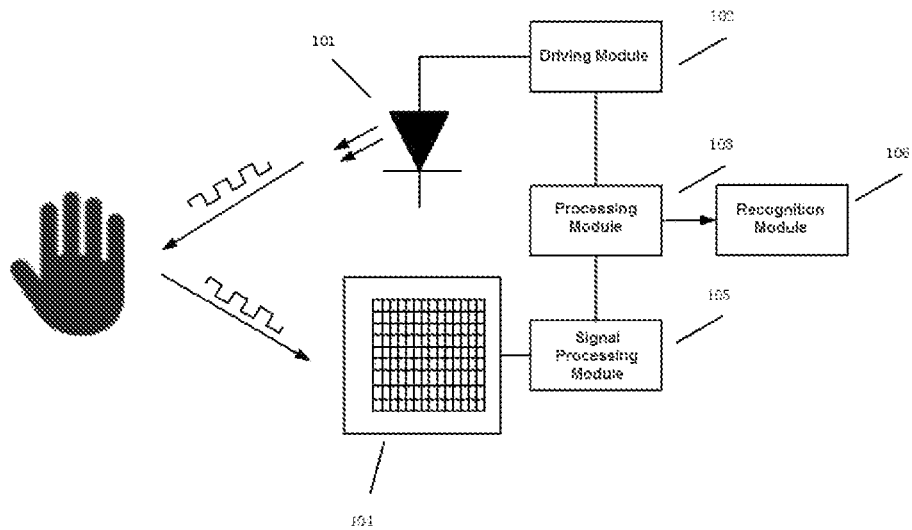
FIG. 1 is a schematic diagram of a gesture recognition system according to an embodiment of the present disclosure.

The embodiments of the present disclosure provide a hand gesture recognition method and apparatus and an Unmanned Aerial Vehicle (UAV) that may recognize a user's gesture by acquiring a depth image of a user. In addition, based on the recognized gesture, a control command corresponding to the gesture may be generated, and the control command may be used to control the UAV, thereby enriching the control manner of the UAV and further improving the enjoyment in controlling the UAV.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used herein have the same or similar meanings as generally understood by a person skilled in the technical field of the present disclosure. As described herein, the terms used in the specification of the present disclosure are intended to describe exemplary embodiments, instead of limiting the present disclosure. The term "and/or" used herein includes any suitable combination of one or more related items listed.

The detailed description will be respectively provided below through specific embodiments.

TOF Camera Calibration

A TOF camera calibration matches the coordinates of a two-dimensional image in a depth image with the coordinates in the camera coordinate system. When combined with the depth information acquired by the TOF camera, three-dimensional coordinates in the camera coordinate system corresponding to each two-dimensional image coordinate, i.e., a three-dimensional point cloud or simply a point cloud, may be obtained. The purpose of the TOF camera calibration is to ensure that the relative positional relationship between the various parts of the point cloud may be consistent with the real world.

The imaging principle of the TOF camera may be the same as a general pinhole camera, except that the receiver of the TOF camera may only receive the modulated infrared light reflected by a target object. The amplitude image acquired by TOF camera may be the same as the gray image acquired by the general camera, and the calibration method of the general camera may be used as a reference.

The coordinates in the two-dimensional image may be (u, v), and the coordinates of the world coordinate system may be (X, Y, Z), then $$\begin{bmatrix} u \\ v \\ 1 \end{bmatrix} = \alpha K \left( R \begin{bmatrix} X \\ Y \\ Z \end{bmatrix} + T \right) \quad (1)$$

Where $$K = \begin{bmatrix} f_x & 0 & c_x \\ 0 & f_y & c_y \\ 0 & 0 & 1 \end{bmatrix}$$

may be an intrinsic parameter matrix of the camera, R may be the rotation matrix of the world coordinate system relative to the camera coordinate system, T may be the translation vector of the world coordinate system, and α may be the proportional coefficient.

According to Zhang Zhengyou's camera calibration algorithm, a black and white checkerboard may be used as the calibration pattern. For each frame of the calibration image, two corresponding points may be obtained using the corner detection, where one set may be the coordinates of each corner point on the checkerboard coordinate system $$\begin{bmatrix} X \\ Y \\ 0 \end{bmatrix}$$

measured and recorded before calibration, and the other set may be the two-dimensional image coordinates $$\begin{bmatrix} u \\ v \end{bmatrix}$$

of the corresponding point detected by the corner point. In theory, the two sets of points should conform to the formula (1) when in fact the noise in the image and the measurement error limit the solution to a least squares solution.

If the Z value in the checkerboard coordinate system is zero, Equational (1) may yield:

$$\begin{bmatrix} u \\ v \\ 1 \end{bmatrix} = \alpha K \left( R \begin{bmatrix} X \\ Y \\ 0 \end{bmatrix} + T \right)$$

$$= \alpha K \left( [r_1 \ r_2 \ r_3] \begin{bmatrix} X \\ Y \\ 0 \end{bmatrix} + T \right)$$

$$= \alpha K [r_1 \ r_2 \ T] \begin{bmatrix} X \\ Y \\ 1 \end{bmatrix}$$

For each frame of the calibrated image, let $H = [h_1 \ h_2 \ h_3] = [\bar{h}_1 \ \bar{h}_2 \ \bar{h}_3]^T = K[r_1 \ r_2 \ T]$, then $$\begin{bmatrix} u \\ v \\ 1 \end{bmatrix} = \alpha H \begin{bmatrix} X \\ Y \\ 1 \end{bmatrix},$$

the homography matrix H may be optimized by using the two sets of corresponding points as shown below:

Let $$m_i = \begin{bmatrix} u_i \\ v_i \end{bmatrix},$$

$$M_i = \begin{bmatrix} X_i \\ Y_i \\ 1 \end{bmatrix},$$

$$\hat{m}_i = \alpha H M_i = \frac{1}{\bar{h}_3^T M_i} \begin{bmatrix} \bar{h}_1^T M_i \\ \bar{h}_2^T M_i \end{bmatrix},$$

where i may refer to each set of corresponding points in the image, then the optimized objective function may be:

$$\Sigma_i (m_i - \hat{m}_i)^T (m_i - \hat{m}_i) \quad (2)$$

Let $=[\bar{h}_1^T \bar{h}_2^T \bar{h}_3^T]^T$, then Equation (1) may be transformed into the following form:

$$\begin{bmatrix} M_i^T & 0 & -uM_i^T \\ 0 & M_i^T & -vM_i^T \end{bmatrix} x = 0$$

This is a 2×9 matrix corresponding to a linear system of equations. For all i groups of corresponding points in the image, a 2i×9 matrix may be written, corresponding to a system of equations consisting of 9 unknowns and 2i equations. For such a system of equations, the least squares solution may be the optical solution of the objective function (2).

The optimal solution may correspond to the homography matrix H in one frame of image, and H=K [$r_1$ $r_2$ T]. Since $r_1$, $r_2$ are orthogonal and are unit vectors, in order to solve the camera's intrinsic parameter matrix K by each H, the following constraints may be needed:

$h_1^T K^{-T} K^{-1} h_2 = 0$ $h_1^T K^{-T} K^{-1} h_1 = h_2^T K^{-T} K^{-1} h_2$

Let $B = K^{-T} K^{-1}$, then $h_i^T B h_j$ may be expressed as $v_{ij}^T b$, where b may be a list of six-dimensional vectors drawn by each element in B since B is a real symmetric matrix with only 6 elements to be determined. The constraint may then be expressed as the following equation:

$$\begin{bmatrix} v_{12}^T \\ (v_{11} - v_{22})^T \end{bmatrix} b = 0$$

The above equation holds for each frame of image, then n images may correspond to a linear equation of 2n equations with 6 unknowns, the least squares solution may be identified to obtain the optimal B, thereby solving the camera intrinsic parameter matrix K.

Using the intrinsic parameter matrix K, the actual coordinates in the camera coordinate system may be obtained by using the depth z of a point acquired by the TOF camera and the coordinates $$\begin{bmatrix} u \\ v \end{bmatrix}$$

of the point in the two-dimensional image using the following equation:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} \frac{x}{z} \\ \frac{y}{z} \\ 1 \end{bmatrix}$$

Subsequently, the camera coordinate system may be obtained, where the three-dimensional coordinates of each point may have a one-to-one correspondence with each two-dimensional image coordinate.

A Gesture Recognition System Based on a TOF Camera

FIG. 1 is a schematic diagram of a gesture recognition system according to an embodiment of the present disclosure. As shown in FIG. 1, the present embodiment provides a gesture recognition system based on a TOF camera. The system includes a transmitter 101 which may be a Light Emitting Diode (LED) or a Laser Diode (LD). The transmitter 101 may be driven by a driving module 102, which may be controlled by a processing module 103, which may control the driving module 102 to output a driving signal to drive the transmitter 101. The frequency, duty ratio, and the like of the driving signal outputted by the driving module 102 may be controlled by the processing module 103. The driving signal may be used to drive the transmitter 101 to emit a modulated optical signal to hit a target object. In the present embodiment, the target object may be a user. When the optical signal hits the user, the optical signal may be reflected and a receiver 104 may receive the optical signal reflected by the user. The receiver 104 may include a photodiode, an avalanche photodiode, and a charge-coupled device. The optical signal reflected by the user may include an optical signal reflected by the user's hand, and the receiver 104 may convert the optical signal into an electrical signal. A signal processing module 105 may process the signal outputted by the receiver 104, such as amplification, filtering, etc., and the signal processed by the signal processing module 105 may be inputted to the processing module 103. The processing module 103 may convert the signal into a depth image containing location information and depth information of the user's palm. It should be noted that, in some cases, the signal processing module 105 may not be included in the gesture recognition system, and the receiver 104 may directly input the electrical signal into the processing module 103; or, the signal processing module 105 may be included in the receiver 104 or the processing module 103. In some cases, the processing module 103 may output the depth image to a recognition module 106, which may recognize the user's gesture based on the depth image. In addition, in some cases, the gesture recognition system may not include the signal processing module 105 as the processing module 103 may directly recognize the user's gesture based on the depth image after converting the electrical signal into the depth image.

Figure 2:
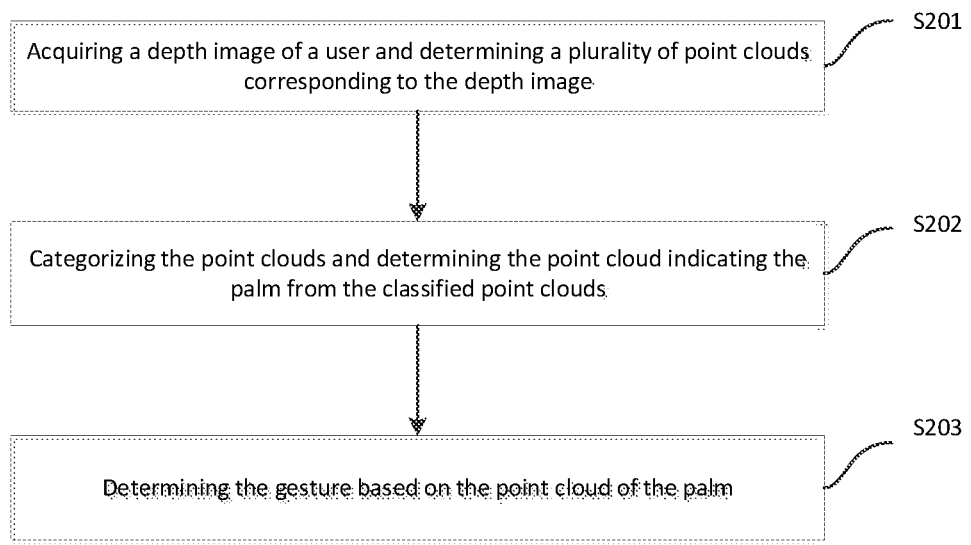
FIG. 2 is a flowchart of a recognition method according to an embodiment of the present disclosure.

FIG. 2 is a flowchart of a recognition method according to an embodiment of the present disclosure. The recognition method may include the following steps:

Step S201: acquiring a depth image of a user and determining a plurality of point clouds corresponding to the depth image.

More specifically, the user may make a specific gesture within a detection range of the TOF camera of a gesture recognition device. The gesture may include a dynamic gesture of the palm, that is, a gesture formed by the user moving the palm, such as moving the palm up and down, left and right, back and forth, etc. In addition, the gesture may further include a static gesture of the palm, that is, the user's hand shape, such as clenching a fist, stretching the palm, extending a finger, extending two fingers, etc. The gesture recognition system may include a TOF camera. An optical signal emitted by the TOF camera may be directed to the user, the TOF camera may receive the optical signal reflected by the user, and the TOF camera may process the received optical signal to output a depth image of the user. Further, after performing the calibration mentioned above, the TOF camera may calculate the user's point clouds based on the depth image. Furthermore, when the TOF camera acquires a frame of the depth image, an acquisition center may be set. The acquisition center may be used as a center of a sphere, and the point clouds may be acquired in the spherical space having a predetermined distance threshold as the radius to eliminate interference. In particular, the acquisition center may be set directly in front of the TOF camera. For example, the acquisition center may be placed in the range of 0.4-2 m directly in front of the TOF camera. More specifically, the acquisition center may be placed 0.8 m, 1 m, 1.1 m, 1.2 m, 1.3 m, 1.4 m, 1.5 m, 1.6 m, or 1.7 m directly in front of the TOF camera. Further, the predetermined distance threshold may be selected by a person skilled in the art based on design requirements. For example, the predetermined distance threshold may be in the range of 10-70 cm, and more specifically, 20 cm, 25 cm, 30 cm, 35 cm, 40 cm, 45 cm, 50 cm, 55 cm, etc. may be selected.

Step S202: categorizing the point clouds and determining the point cloud indicating the palm from the categorized point clouds.

Since the point clouds of the user may include point clouds of multiple parts of the user's body, such as the hand, the head, the torso, etc., in order to determine the gesture, the point clouds indicating the user's hand may need to be extracted first, then these point clouds may be categorized. After categorization, one or more clusters of point clouds may be obtained, and the point cloud indicating the palm of the user may be determined from the clusters obtained by the categorization. The point cloud of the user's palm obtained may be the extracted palm of the user, and the gesture of the user may be recognized based on the point cloud indicating the palm of the user.

Step S203: determining the gesture based on the point cloud of the palm.

More specifically, the point cloud indicating the palm of the user may indicate the location information of the user's palm, or the contour information of the palm, etc. The user's dynamic gesture may be identified based on the location information contained in the point cloud, and the user's static gesture may be identified based on the contour information of the palm.

In the present embodiment of the present disclosure, the point clouds of the user may be acquired and categorized, the point cloud indicating the palm may be determined from the point clouds obtained by the categorization, and a gesture of the user may be recognized based on the point cloud indicating the palm. According to the embodiment of the present disclosure, when the resolution of the depth image acquired by the TOF camera is low, the user's palm may be accurately extracted from the depth image. At the same time, when the acquisition frame rate of the TOF camera is low, the motion trajectory of the user's palm may be accurately extracted, thereby accurately identifying the gesture of the user, saving computing resources, and increasing recognition rate.

In some embodiments, the point cloud categorization may be performed to obtain a plurality of clusters of point clouds, and the point cloud indicating the palm may be determined from one of the clusters. More specifically, based on a-priori information, when the user gestures to the TOF camera, the distance between the head, the torso, the hand, the feet, etc. of the user's body may be different from the TOF camera, that is, the depth information of the torso and the hand of the user's body may be different. In addition, when the user gestures to the TOF camera, the point clouds of the same part of the user's body may be generally close to each other. Therefore, based on the a-priori information of different parts of the body at different spatial locations when the user gestures to the TOF camera, different parts of the user's body within the detection range of the TOF camera may be categorized, and one or more clusters of point clouds may be obtained. Different clusters generally represent different parts of the user's body, and different parts of the body may be distinguished through the categorization. At this time, it may be only necessary to determine the part belonging to the palm in a specific part of the categorization, that is, the cluster of a certain point cloud obtained by the categorization to determine the point cloud indicating the palm of the user, so the search range of the user's palm may be narrowed and the accuracy of the recognition may be improved.

In some embodiments, a clustering algorithm may be used to categorize point clouds. More specifically, the k-means categorization in the clustering algorithm may be used for the categorization. K-means clustering is an unsupervised categorization algorithm, and the number of clustering categories of the categorization must be specified in advance. If it is possible to determine that only to torso and the hand of the human body are within the TOF detection range, then the number of clustering categories may be set to 2. However, in practice, the detection range of the TOF camera may include objects other than the user, or only the user's hand may be in the detection range of the TOF and the user's torso may be missing, so the number of clustering categories may be uncertain. If the number of clustering categories is greater than the actual number of categories, then the point clouds that should be categorized into one category will be divided. Conversely, the point clouds that do not belong to the same category will be categorized into one category. Therefore, in the embodiment of the present disclosure, the clustering categories of the clustering algorithm may be adjustable in the process of categorizing the point clouds using the clustering algorithm. The adjustment of the number of clustering categories in the clustering algorithm will be described in detail below.

More specifically, the number of clustering categories may be adjusted based on a degree of dispersion between the clusters, where the degree of dispersion may be represented by the distance between the clustering centers of the respective clusters. Before the clustering algorithm is performed, the initial clustering categories may be set to n. For example, n may be set to 3, and n may be a parameter that may be adjusted while performing the clustering algorithm. A k-mean clustering may be performed to obtain each cluster center, and the degree of dispersion of each cluster center may be calculated. If the distance between two cluster centers is less than or equal to a distance threshold set in the categorization algorithm, then n may be reduced by 1, and the clustering may be performed again. In particular, the distance threshold may be an adjustable parameter. For example, the distance threshold may be set in the range of 10-60 cm, and more specifically, it may be set to 10 cm, 15 cm, 20 cm, 25 cm, 30 cm, or the like. If the categorization effect of the clustering algorithm is poor, then n may be increased by 1, and the clustering may be performed again. When the distance between all cluster centers is greater than or equal to the distance threshold, the execution of the clustering algorithm may be terminated. At this point, the point cloud indicating the user may be categorized, and the current clustering category number and the clustering centers may be returned.

Figure 3:
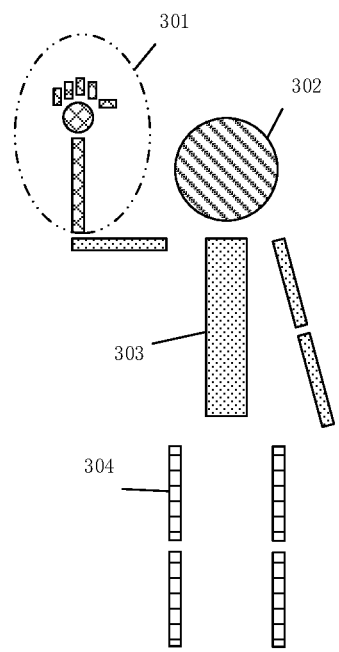
FIG. 3 is a schematic diagram of categorizing a plurality of point clouds to instruct a user according to an embodiment of the present disclosure.

In some embodiments, a cluster indicating the point clouds of the hand may be determined from the plurality of clusters based on the depth information, and a point cloud indicating the palm may be determined from the cluster of point clouds indicating the hand. More specifically, the point clouds of the user may be categorized, and one or more point clouds may be obtained. FIG. 3 is a schematic diagram of categorizing a plurality of point clouds to instruct a user according to an embodiment of the present disclosure. As shown in FIG. 3, after categorizing the user's point clouds, 4 clusters may be obtained. The 4 clusters may be cluster 301, cluster 302, cluster 303, and cluster 304, respectively, and each cluster may represent a different average depth. Based on the a-priori information, when the user gestures to the TOF camera, the hand may be the closest part to the TOF camera, that is, the depth of the hand may be the smallest. Therefore, the average depth of each of the clusters may be obtained, for example, the average depth of cluster 301, cluster 302, cluster 303, and cluster 304 may be obtained, and the cluster with the smallest average depth may be determined as the cluster indicating the user's hand. That is, the cluster 301 may be determined to be the cluster indicating the user's hand. In this way, the point clouds of the user's hand and palm may be determined from the point clouds of the user, and after obtaining the point clouds indicating the user's hand, the point cloud indicating the user's palm may be further determined from the point clouds indicating the user's hand. In particular, the 4 clusters obtained after categorizing the point clouds of the user is only for the purpose of illustration, and the technical solutions of the present embodiment are not limited.

In some embodiments, the point cloud indicating the arm may be deleted from the cluster of the point clouds indicating the hand and the remaining point clouds in the cluster may be determined as the point cloud indicating the palm. More specifically, the user's hand may include the user's palm and arm, and the point cloud indicating the arm is typically included in the cluster of the point clouds of the user's hand. To improve the accuracy of the gesture recognition, the point cloud of the arm may be determined from the point clouds indicating the hand, the point cloud indicating the arm may be deleted, and the remaining point clouds may be determined as the point cloud of the palm, so the palm may be accurately extracted, and the gesture may be recognized subsequently based on the point cloud of the palm. The method of deleting the point cloud of the arm from the point clouds indicating the hand will be described in detail below.

In some embodiments, the point with the smallest depth may be extracted in the cluster of point clouds indicating the hand, the distances between the point clouds in the cluster and the point with the smallest depth may be determined, and the points with distances greater than or equal to the distance threshold may be determined as the point cloud of the arm. More specifically, in the cluster of the point clouds indicating the user's hand mentioned above, the arm is typically included in the hand, and the point cloud of the arm included in the hand needs to be deleted before performing the specific gesture recognition. A depth histogram indicating the cluster of point clouds indicating the user's hand may be first calculated, and the point with the smallest depth may be extracted by using the histogram. The point with the smallest depth is typically the fingertip of the finger. The distances from other points in the cluster to the point with the smallest depth may be calculated, and all the points whose distance exceeds the distance threshold may be determined as the points indicating the arm. These points may be deleted, and the remaining points may be retained. That is, the points whose distance is less than or equal to the distance threshold may be determined as the point cloud indicating the user's palm. In particular, the distance threshold may be adjusted based on requirements, or determined based on the average size of the palm, such as 10 cm, 13 cm, 15 cm, 17 cm, etc.

Figure 4:
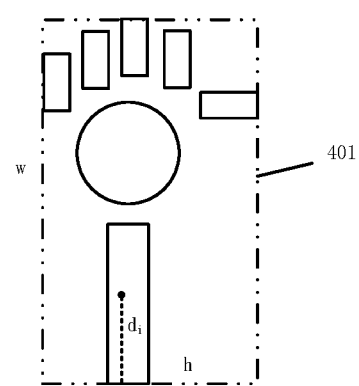
FIG. 4 is a schematic diagram of deleting a point set indicating a two-dimensional image of a user's arm from a point set indicating a two-dimensional image of a user's hand according to another embodiment of the present disclosure.

In some embodiments, a set of points indicating the two-dimensional image of the hand may be determined based the cluster of point clouds indicating the hand, a minimum rectangle of that circumscribes the point set of the two-dimensional image of the hand may be determined, and the distances between the points in the point set of the two-dimensional image of the hand to a designated side of the minimum circumscribed rectangle may be determined. In the present disclosure, a point set may refer to a collection of points that may belong to one or more point clouds. Here, the points whose distance does not meet the predetermined distance requirement may be determined as the points indicating the two-dimensional image of the arm. Once the point set indicating the two-dimensional image of the arm is determined, the point cloud indicating the arm may be determined based on the point set indicating the two-dimensional image of the arm, and the point cloud indicating the arm may be deleted. More specifically, a frame of the depth image may be acquired, the point cloud of the user in the frame of depth image may be determined, and the point cloud indicating the hand of the user of the frame of depth image may be determined based on the method mentioned above. Since the three-dimensional coordinates of each point cloud may have a one-to-one correspondence with the two-dimensional coordinates of the points on the two-dimensional image, and the two coordinates are always stored in the process of gesture recognition, after acquiring the point cloud indicating the user's hand, the point set of the two dimensional image of the user's hand may be determined. FIG. 4 is a schematic diagram of deleting a point set indicating a two-dimensional image of a user's arm from a point set indicating a two-dimensional image of a user's hand according to another embodiment of the present disclosure. As shown in FIG. 4, a minimum circumscribed rectangle 401 of a point set of the two-dimensional image of the user's hand may be acquired, and the distances between the points in the point set of the two-dimensional image of the user's hand to the designated side of the circumscribe rectangle may be determined. The points that do not meet the predetermined distance requirement may be determined as the points indicating the arm, that is, points whose distance do not meet the predetermined distance may be the points indicating the arm and may be deleted. The remaining point set may be the point set indicating the two-dimensional image of the palm, and the point cloud of the palm may be obtained based on the point set of the two-dimensional image of the palm.

As shown in FIG. 4, the predetermined distance requirement may be determined by the side length of the minimum circumscribed rectangle 401. More specifically, take the long side of the rectangle as w and the short side of the rectangle as h. For example, the designated side may be the lower short side, and the distance $d_i$ from each point in the point set of the two-dimensional image indicating the hand to the lower short side may be calculated. If $d_i < w - 1.2h$, then the point may be determined as the point indicating the arm. In this way, all the point sets indicating the two-dimensional image of the arm may be deleted, and the remaining point sets may be the point sets indicating the two-dimensional image of the palm, that is, the point cloud indicating the arm may be deleted. A hypothesis is used here, that is, h may represent the width of the palm on the two-dimensional image. Based on the ratio of the width of the palm to the length of the palm, 1.2 h may be determined as the length of the palm, and the difference between w and 1.2 h should be the maximum distance from the points on the arm to the lower short side. If the distance from a point in the point set of the two-dimensional image to the lower short side is less than or equal to the maximum distance, then the point may belong to the arm. In particular, $d_i<w-1.2\ h$ is only one implementation method for determining the predetermined distance requirement based on the side length of the minimum circumscribed rectangle, and other methods may be selected by those skilled in the art. For example, the length of the palm may be 1.1 h, 1.15 h, 1.25 h, 1.3 h, 1.35 h, 1.4 h, etc., and is not specifically limited herein.

In some embodiments, the point set of the two-dimensional image of the palm may be acquired based on the point cloud indicating the palm of the user, and the gesture may be determined based on the distribution characteristics of the point set. More specifically, the gesture determined here is the user's static gesture, such as clenching a fist, stretching the palm, extending a finger, extending two fingers, etc. In particular, a frame of the depth image may be acquired, the point cloud of the user in the frame of depth image may be determined, and the point cloud indicating the palm of the user of the frame of depth image may be determined based on the method mentioned above. Since the three-dimensional coordinates of each point cloud may have a one-to-one correspondence with the two-dimensional coordinates of the points on the two-dimensional image, and the two coordinates are always stored in the process of gesture recognition, after acquiring the point cloud indicating the user's palm, the point set of the two dimensional image of the user's palm may be determined. Due to the difference in the user gestures, that is, different gestures may correspond to different hand types, the distribution characteristics of the point set of the two-dimensional image of the palm may be different. For example, the distribution characteristics of the first gesture and the distribution characteristics of the extended palm may be very different, so that the distribution characteristics of the point set of the two-dimensional image of the palm may be determined, and the gesture made by the user in the frame of image may be specifically determined based on the distribution characteristics.

Figure 5:
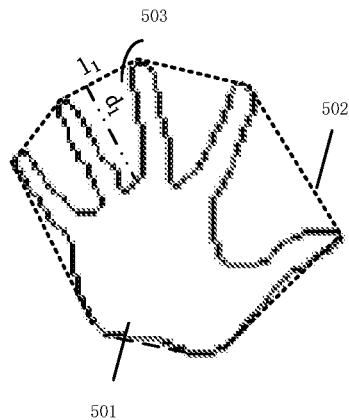
FIG. 5 is a schematic diagram of determining the distribution characteristics of a point set indicating a palm of a user based on a point set of a two-dimensional image according to an embodiment of the present disclosure.

In some embodiments, a distribution area of the point set indicating the two-dimensional image of the palm may be determined, and the distribution characteristics of the point set may be determined based on the distribution area. More specifically, the distribution area of the point set may be determined based on the point set of the two-dimensional image indicating the palm. FIG. 5 is a schematic diagram of determining the distribution characteristics of a point set indicating a palm of a user based on a point set of a two-dimensional image according to an embodiment of the present disclosure. As shown in FIG. 5, in some embodiments, the distribution area of the point set may be determined using the method of creating an image mask, such as a distribution area 501 in FIG. 5. In particular, the distribution area 501 may be an area occupied by the palm of the user on the two-dimensional image, and the shape and contour of the distribution area of different gestures may be different. The distribution characteristics of the point set indicating the palm may be determined by the shape and contour of the distribution area 501, and the user's gesture may be determined based on the distribution characteristics.

In some embodiments, a polygonal area may be used to cover the distribution area, a plurality of non-overlapping areas between the polygonal area and the distribution area may be determined, and the distribution characteristics of the point set may be determined based on the non-overlapping areas. More specifically, since the distribution area is a generally irregular shape, in order to further determine the characteristics of the distribution area, it may be possible to set the pixel value of all the points in the point set indicating the two-dimensional image of the hand to 1, and the pixel value of other points in the two-dimensional image may be set to 0, and a polygon may be used to cover the distribution area, that is, using the polygon to cover all the points in the point set. In particular, the polygon may be a convex polygon having the least number of sides. As shown in FIG. 5, in some embodiments, a convex hull operation may be performed on the point set of the binarized two-dimensional image indicating the palm, and the point set may be covered by the convex polygon 502 with the least number of sides. Each vertex of the convex polygon may be a point in the point set such that there may be a non-overlapping area 503 between the distribution area 501 of the point set of the two-dimensional image and the polygon 502. The shape and size of the non-overlapping area 503 may represent the distribution characteristics of the point set, that is, the gestures of the user may be determined based on certain characteristics of the non-overlapping area.

In some embodiments, a farthest distance from the points in the non-overlapping area to a side of the corresponding polygon may be determined, and the distance may be determined as a distribution characteristic of the point set. More specifically, as shown in FIG. 5, a distribution characteristic of the point set may be determined based on the non-overlapping area. For example, in the non-overlapping area 503, the side of the polygon corresponding to the non-overlapping area 503 may be $l_i$, and a point farthest from the side $l_i$ may be determined from the non-overlapping area 503. The farthest distance $d_i$ may be used as the distribution characteristic of the point set, and the user's gesture may be determined based on the distance $d_i$. It should be noted that the distance $d_i$ mentioned above may be the farthest distance, or it may be a combination of a plurality of farthest distances, which may be selected by a person skilled in the art based on the requirements, and FIG. 5 is merely provided for illustrative purposes.

In some embodiments, when the farthest distance corresponding to each side of the polygon is less than or equal to the predetermined distance threshold, the gesture may be determined to be a fist. Further, when one or more of the farthest distances corresponding to polygon is greater than or equal to the predetermined distance threshold, the gesture may be determined to be a stretched palm. More specifically, when the user stretches the palm, the non-overlapping area between the distribution area formed by the point set indicating the two-dimensional image of the palm and the polygon may be large. In particular, the distance between the side of the polygon surrounding the palm and the joints of the fingers may be farther. In addition, when the palm is stretched, a plurality of such non-overlapping areas may be formed, and these non-overlapping areas may be significantly different from the non-overlapping areas formed on a fist. When the user makes a fist, the shape of the distribution area formed by the point set indicating the two-dimensional image of the palm may conform to the polygon, therefore, after the convex hull operation, the area of the non-overlapping area formed by the distribution area and the polygon may be small. Further, the farthest distance corresponding to each side of the polygon may be relatively short, so the predetermined distance threshold may be set. When the farthest distance corresponding to each side of the polygon is less than or equal to the predetermined distance threshold, the gesture may be determined to be a fist. Further, when one or more of the farthest distances corresponding to polygon is greater than or equal to the predetermined distance threshold, the gesture may be determined to be a stretched palm. Furthermore, a second threshold may be set based on the length of the fingers.

In some embodiments, a plurality of frames of the depth image of the user may be acquired, and the point clouds indicating the user's palm corresponding to each frame of the depth image may be determined from the plurality frames of the depth image. The point clouds corresponding to each frame of the depth image may be categorized, and the point clouds indicating the palm corresponding to each frame of the depth image may be determined from the categorized point clouds. The location information of the palm corresponding to each frame of the depth image may be determined based on the point clouds indicating the user's palm corresponding to each frame of image.

More specifically, the gesture of the user may be determined by a plurality of frames of depth image, where the gesture may be formed by the movement of the user's palm. In order to recognize the gesture, the palm of each frame of the depth image may be first extracted, and the point cloud of the user's palm corresponding to each frame of the image may be obtained based on each frame of the depth image using the method mentioned above. The location information of the palm may be calculated based on the point cloud of the user's palm corresponding to each frame of the image, where the location of the geometric center of the point cloud indicating the palm may be used as the location information of the palm. In addition, the location of the point indicating the depth information in the point cloud of the palm may be used as the location information of the palm. A person skilled in the art may use different methods to determine the location information of the palm based on the point cloud indicating the palm of the user, which is not specifically limited herein.

In one embodiment, the location information of the palm calculated from the plurality frames of the depth image may be stored in a sequence P, where the length of the sequence P may be L. The location information of the oldest palm may be replaced with the location of the recently acquired palm using the first-in-first-out storage method. The sequence P may reflect the trajectory of the palm movement in a fixed period of time, where the trajectory may represent the gesture of the user, so the user's gesture may be recognized based on the sequence P, which is the sequence of location information of the palm. Further, after obtaining the location information of the palm corresponding to a frame of the depth image, the location of the points indicated by the location information may be used as the acquisition center. When determining the location information of the palm corresponding to the next frame of the depth image, the point cloud of the user may be acquired in the spherical space having a predetermined distance threshold as the radius using the acquisition center as the center of the sphere. That is, the user's hand may only be extracted in the spherical space, which may improve the recognition velocity of the hand. In addition, the Kalman filtering algorithm may be used to estimate the movement model of the palm to predict the location of the palm indicated by the next frame of the depth image, and the palm of the user may be extracted near the predicted location of the palm. Further, the filtering algorithm may be turned on or off at any time.

In some embodiments, the movement directions of the palm motion corresponding to the location information in the sequence may be determined based on a sequence indicating the location information of the palm, and the gesture may be determined based on the sequence composed of the movement directions. More specifically, the movement directions corresponding to the location information may be calculated based on the L location information in the sequence P. In particular, the movement direction corresponding to of each of the L location information may be determined, and the movement direction corresponding to each of the plurality of location information of the L location information may be determined as well. The sequence of the movement directions obtained may compose a plurality of movement directions that may represent the motion trajectory of the palm in the air and the changes in the movement. Therefore, the user's gesture may be determined based on the sequence of the movement directions. It should be noted that the movement direction corresponding to the location information in the sequence P may be a velocity direction corresponding to the location information, or it may be a direction determined in some ways based on the velocity direction.

In some embodiments, a ratio of each of the movement directions may be determined and the movements of the palm may be determined based on the combination of the ratios. More specifically, the ratio of each of the movement directions in the sequence of the movement directions may be counted, so that a ratio sequence of the ratios may be obtained, and the ratio sequence may be used to determine the user's gesture. In this way, when the user gestures, no matter where the starting point and the end point of the palm movements may be, a sequence of the same ratio may be obtained, which may be convenient for processing purposes. When the gesture recognition is performed, the ratio sequence may be entered into a predetermined computing model, which may identify the gesture of the user based on the ratio sequence. In particular, the predetermined computing model may be a neural network, a classifier, or the like. Before performing the gesture recognition, the predetermined computing model may need to be trained, that is, a ratio sequence corresponding to a large number of gestures may need to be collected offline. The ratio sequence may be used as an input, the gesture corresponding to the ratio sequence may be an output, and the predetermined computing model may be trained. After the training is completed, the predetermined computing model may be used for gesture recognition.

Figure 6:
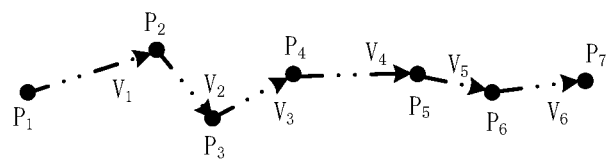
FIG. 6 is a schematic diagram of determining a velocity direction corresponding to location information based on location information of a palm according to an embodiment of the present disclosure.
Figure 7:
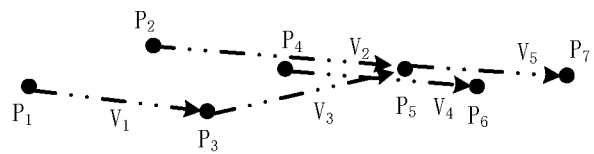
FIG. 7 is a schematic diagram of determining a velocity direction corresponding to location information based on location information of a palm according to another embodiment of the present disclosure.

In some embodiments, the velocity directions corresponding to the location information may be determined based on a sequence indicating the location information of the palm, and the sequence of velocity directions may be determined based on the sequence of the velocity direction. More specifically, since the frame rate of the data collected by the TOF camera is relatively low, the location information indicating the palm may be very scattered, and it may be difficult to obtain the tangential velocity direction of the palm movement in each frame of the depth image. In the present embodiment, FIG. 6 is a schematic diagram of determining a velocity direction corresponding to location information based on location information of a palm according to an embodiment of the present disclosure. As shown in FIG. 6, $P_i$ may represent the location points of the palm indicated by one frame of the depth image, that is, the location points indicated by the location information. For illustrative purpose, L may be set to 7, and the velocity direction may be determined using the sequence of location information of the palm, that is, based on the sequence of the location points of the palm. More specifically, the velocity direction of location $P_2$ of the palm may be from location point $P_1$ to location $P_2$, the velocity direction location $P_3$ of the palm may be from location point $P_2$ to location point $P_3$, and so on, and the sequence of the velocity directions may be obtained ($V_1, V_2, \ldots, V_6$). The sequence of velocity directions may represent the changes in the movement direction of palm, and the sequence of movement directions may be determined based on the sequence of movement directions. It should be noted that the length of L of the sequence is for illustrative purposes only, and those skilled in the art may choose a value of L to represent the length. In addition, those skilled in the art may use other methods to calculate the movement direction corresponding to the location point. For example, FIG. 7 is a schematic diagram of determining a velocity direction corresponding to location information based on location information of a palm according to another embodiment of the present disclosure. As shown in FIG. 7, the movement direction of location $P_3$ of the palm may be from location point $P_1$ to location $P_3$, the movement direction location $P_4$ of the palm may be from location point $P_2$ to location point $P_4$, and so on, and the sequence of the velocity directions may be obtained ($V_1$, $V_2$, . . . , $V_5$). It should be noted that after obtaining the sequence of the velocity directions, the sequence of the velocity directions may be entered into a filter. More specifically, the sequence of the velocity directions may be entered into a Kalman filter, so the noise in the sequence of the velocity directions or the anomaly in the variation may be filtered out.

Figure 8:
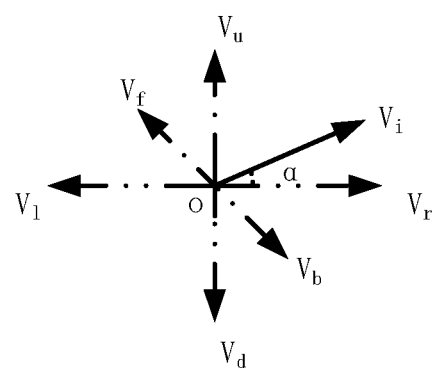
FIG. 8 is a schematic diagram of determining a movement direction corresponding to location information based on a velocity direction corresponding to location information of a palm according to another embodiment of the present disclosure.

In some embodiments, the velocity directions corresponding to the location information in the sequence may be determined, an angle between the velocity direction and each of the plurality of predetermined directions may be determined, and the movement directions may be determined based on the angles. For the sake of brevity, the present disclosure only illustratively described the method of determining the movement direction corresponding to one velocity direction in the sequence of velocity directions, and the movement directions corresponding to the other velocity directions in the sequence of velocity directions may be determined using the same method. More specifically, the angle between the velocity direction and each of the plurality of predetermined directions may be determined, and the movement directions may be determined based on the angles. Since the velocity direction corresponding to the location information calculated using the method above may be very scattered, in order to facilitate the subsequent processing, it may be necessary to categorize the velocity directions to group the velocity directions that may be very different into the same direction. FIG. 8 is a schematic diagram of determining a movement direction corresponding to location information based on a velocity direction corresponding to location information of a palm according to another embodiment of the present disclosure. As shown in FIG. 8, a plurality of predetermined directions may be set, such as $V_u$, $V_d$, $V_l$, $V_r$, $V_f$, $V_b$, which may represent the six predetermined directions of up, down, left, right, front and back. The velocity direction $V_i$ corresponding to the location point may be calculated based on the directions mentioned above, and the unit vector corresponding to the velocity direction may be separately multiplied by the corresponding single-phase vector of each of the six predetermined directions to calculate $\alpha_1$-$\alpha_6$, which may be used to determine the movement direction based on the location information. More specifically, the smallest angle $\alpha_t$ may be determined from $\alpha_1$-$\alpha_6$ and a first predetermined direction (such as $V_r$, shown in FIG. 8) corresponding to al may be determined as the movement direction corresponding to the location information. The six predetermined directions of up, down, left, right, front and back set in the present embodiment is for illustrative purpose only. Those skilled in the art may set more predetermined directions when the hardware condition permits, so the categorization of the velocity directions may be more precise and the error in the movement directions corresponding to the location information may be smaller. In short, the selection of the number of predetermined directions may be selected by those skilled in the art based on design requirements and hardware conditions and is not specifically limited herein.

In some embodiments, a rate corresponding to the location information may be determined based on the sequence of location information, and when the rate is less than a predetermined rate threshold, the palm may be determined to be in a stationary state at the location indicated by the location information. More specifically, as shown in FIG. 6, the rate corresponding to the location information in the sequence P, that is, the rate at which the palm may be at the location point indicated by the location information may be determined based on the location information in the sequence P. The rate may be calculated based on the displacement of the palm, where the displacement may be calculated based on the location information in the location sequence. Since the time interval between two adjacent location information in the location information sequence P may be the same, it may be possible to use the displacement to represent the rate corresponding to the location information directly without using the time information. For example, the rate corresponding to $P_2$ may be the displacement from $P_1$ to $P_2$, where the displacement may be obtained based on the location information of $P_1$ and $P_2$, and the rate corresponding to $P_3$, $P_4$, $P_5$, $P_6$, and $P_7$ may be obtained using the same method. When the rate is less than or equal to the rated threshold, the palm may be considered to be in a stationary state and there may be no movement direction. In addition, the rate corresponding to the location information may also be calculated in other methods. For example, as shown in FIG. 7, the rate corresponding to $P_3$ may be the displacement from $P_1$ to $P_3$, and is not specifically limited herein.

In some embodiments, in order to avoid mistakenly determining the switching between different gestures as a user's circular gesture, a corresponding two-dimensional image coordinate sequence may be acquired based on the location sequence. That is, the points on the two-dimensional image may be acquired, and the vectors corresponding to the points on the two-dimensional image may be cross-producted in cyclic, that is, each point may be cross-producted with the next point, the last point may be cross-producted with the first point, and an area enclosing the two-dimensional image may be calculated. When the area is less than or equal to a predetermined area threshold, the current gesture of the user may be determined to be not a circular gesture. To some extents, using the area to determine may eliminate the mis-determination that may exist when switching between different gestures. In particular, the predetermined area threshold may be selected by a person skilled in the art based on design requirements, such as 40, 50, 60, 70, and the like.

In some embodiments, the tick gesture of the user may be determined based on the location information sequence mentioned above. More specifically, a project sequence of the sequence indicating the location of the palm on the XY plane may be acquired, and the points in the projection sequence may be traversed. If a specific point is determined to satisfy a predetermined requirement from the points in the sequence, a tick gesture may be determined to be recognized. When the user makes the tick gesture, the distance of the palm from the TOF camera may be nearly constant, that is, the value in the Z direction in the three-dimensional space may be substantially unchanged. Therefore, when determining the tick gesture, the location information sequence may be project to the XY plane regardless of the Z coordinate. Further, based on the a-priori information, when the user makes the tick gesture, the trajectory of the palm may have a lowest point on the XY plane. The motion trajectory of the gesture on both sides of the lowest point may be substantially a straight line, the slopes of the two substantially straight lines may be opposite to each other, and the lowest point may be determined as the specific point that may satisfy the predetermined requirement. In particular, the first motion trajectory formed by the specific point and the point the sequence before the specific point may be determined to be a substantially straight line, the second motion trajectory formed by the specific point and the point in the sequence after the specific point may be determined to be a substantially straight line, and the slope of the first motion trajectory may be opposite to the second trajectory in direction.

In some embodiments, a point in the projection sequence may be acquired and used as a current point, a point in the sequence before the current point may be acquired, the current point and the point in the sequence before the current point may be fitted with a straight line to obtain a first correlation coefficient and a first slope. If the correlation coefficient is greater than or equal to a correlation coefficient threshold, the first motion trajectory may be determined to be substantially a straight line. Further, a point in the sequence after the current point may be acquired, the current point and the point in the sequence after the current point may be fitted with a straight line to obtain a second correlation coefficient and a second slope. If the correlation coefficient is greater than or equal to the correlation coefficient threshold, the first and second motion trajectories may be both determined to be substantially a straight line, and the first slope and the second slope may be opposite in direction, then the current point may be determined to be the specific point that may satisfy the predetermined requirement. Furthermore, if one or both of the first correlation coefficient and the second correlation coefficient are less than or equal to the correlation coefficient threshold, or the first slope and the second slope have the same direction, the next point in the projection sequence may be acquired and used as the current point.

Figure 9:
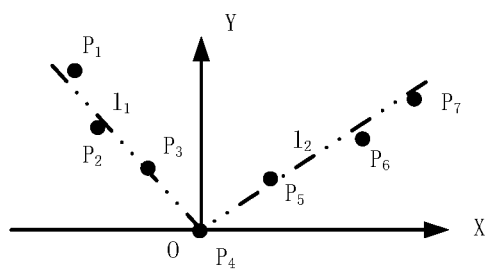
FIG. 9 is a schematic diagram of recognizing a tick gesture according to an embodiment of the present disclosure.

More specifically, FIG. 9 is a schematic diagram of recognizing a tick gesture according to an embodiment of the present disclosure. As shown in FIG. 9, if $P_4$ is the current point, points $P_3$, $P_2$, and $P_1$ before point $P_4$ may be acquired by traversing forward from point $P_4$. $P_4$, $P_3$, $P_2$, and $P_1$ may be fitted with a straight line to obtain a trajectory $l_1$ and its correlation coefficient and slope $k_1$. Further, points $P_5$, $P_6$, and $P_7$ after point $P_4$ may be acquired by traversing backward from point $P_4$. $P_4$, $P_5$, $P_6$, and $P_7$ may be fitted with a straight line to obtain a trajectory $l_2$ and its correlation coefficient and slope $k_2$. When the correlation coefficients of the trajectory $l_1$ and the trajectory $l_2$ are both greater than or equal to the correlation coefficient threshold, trajectory $l_1$ and trajectory $l_2$ may be determined to be straight lines, otherwise the next point may be taken as the current point, and the above method may be repeated. When trajectory $l_1$ and trajectory $l_2$ are both determined to be straight lines, slopes $k_1$ and $k_2$ of trajectory $l_1$ and trajectory $l_2$, respectively, may be obtained. If the two slopes are opposite in direction to each other, then the user's current gesture may be determined to be a tick gesture. In this way, by traversing the point in the projection sequence until a specific point is determined, whether the current gesture is a tick gesture may be determined. In particular, the correlation coefficient may be selected by a person skilled in the art based on requirements, for example, it may be selected as 0.8.

In some embodiments, traversing may be performed from the current point to the point before the current point to obtain a sum of displacements of the current point and the points traversed before the current point. When the sum of displacements is greater than or equal to a predetermined displacement threshold, the traversing may be stopped, and the current point and the points traversed before the current point may be fitted with a straight line. Further, traversing may be performed from the current point to the point after the current point to obtain a sum of displacements of the current point and the points traversed after the current point. When the sum of displacements is greater than or equal to the predetermined displacement threshold, the traversing may be stopped, and the current point and the points traversed after the current point may be fitted with a straight line. More specifically, as shown in FIG. 9, if $P_4$ is the current point, then point $P_3$ may be acquired by traversing forward from point $P_4$. A displacement $d_1$ between $P_4$ and $P_3$ may be obtained and the displacement $d_1$ may be determined to be greater than or equal to the predetermined displacement threshold D. If $d_1$ is less than D, the traversing may continue to $P_2$, and a displacement $d_2$ may be obtained between $P_2$ and $P_3$. Next, determine whether $d_1+d_2$ is greater than the predetermined displacement threshold D. If $d_1+d_2$ is greater than the predetermined displacement threshold D, stop traversing and perform the straight-line fitting on $P_4$, $P_3$, and $P_2$. Otherwise, the traversing may continue to $P_1$ and the above method may be repeated until the sum of displacements is greater than the predetermined displacement threshold D, then the traversing may be stopped, and straight-line fitting may be performed on the current point and the points traversed before the current point. Similarly, traversing the points after the current point may also be performed using the above method, and for brevity, it will not be described again. If the sum of displacements of the current point and the points traversed before the current point is less than D, it may mean that the current end of the projection sequence may be too close, which may cause the number of points before the current point to be insufficient or the amount of information before the current point to be insufficient, and the next point may be used as the current point. Similarly, if the sum of displacements of the current point and the points traversed after the current point is less than D, the next point may be used as the current point as well.

The embodiment of the present disclosure provides a computer storage medium having computer executable instructions stored therein. The computer executable instructions stored in the computer storage medium may be executed to perform the above recognition method.

Figure 10:
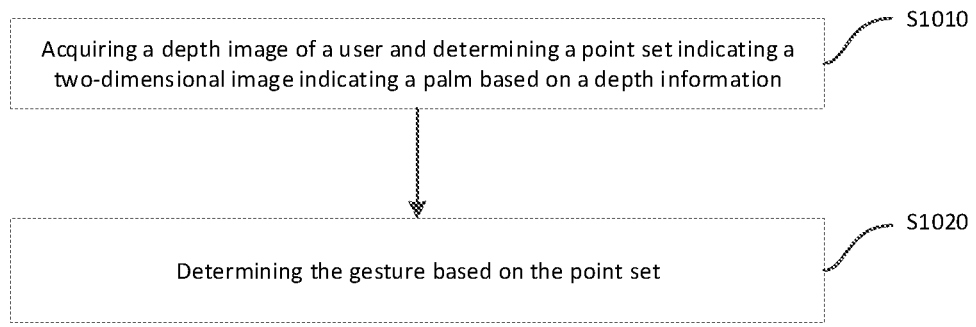
FIG. 10 is a flowchart of a recognition method according to another embodiment of the present disclosure.

As shown in FIG. 10, an embodiment of the present disclosure further provides a recognition method including the following steps:

Step S1010, acquiring a depth image of a user and determining a point set indicating a two-dimensional image of a palm based on depth information.

More specifically, the user may make a specific gesture within a detection range of the TOF camera of a gesture recognition device. The gesture may include a dynamic gesture of the palm, that is, a gesture formed by the user moving the palm, such as moving the palm up and down, left and right, back and forth, etc. In addition, the gesture may further include a static gesture of the palm, that is, the user's hand shape, such as clenching a fist, stretching the palm, extending a finger, extending two fingers, etc. The gesture recognition system may include a TOF camera. An optical signal emitted by the TOF camera may be directed to the user, the TOF camera may receive the optical signal reflected by the user, and the TOF camera may process the received optical signal to output a depth image of the user. Based on the a-priori information, when the user gestures to the TOF camera, the distances between different parts of the body and the TOF camera may be different, that is, the depths may be different. Therefore, the point set of the two-dimensional image of the user's palm may be determined based on the depth information, that is, the image coordinates $$\begin{bmatrix} u \\ v \end{bmatrix}$$

of all the points of the palm on the two-dimensional image may be obtained.

Step S1020: determining the gesture based on the point set.

More specifically, after acquiring the point set indicating the two-dimensional image of the palm, the user's palm may be successfully extracted. After extracting the point set indicating the two-dimensional image of the palm, the gesture of the user may be recognized based on the point set.

In the embodiment of the present disclosure, a point set indicating the two-dimensional image of the palm may be determined based on the depth image of the user, and the user's gesture may be recognized based on the point set. According to the embodiment of the present disclosure, when the resolution of the depth image acquired by the TOF camera is low, the user's palm may be accurately extracted from the depth image. At the same time, when the acquisition frame rate of the TOF camera is low, the motion trajectory of the user's palm may be accurately extracted, thereby accurately identifying the gesture of the user, saving computing resources, and increasing recognition rate.

In some embodiments, a point indicating the palm on the two-dimensional image may be determined based on the depth information, a point set connected with the point indicating the palm may be determined based on a predetermined depth range, and a point set indicating the two-dimensional image of the palm may be determined based on the connected set of points. More specifically, based on the a-priori information, when the user gestures to the TOF camera, the distance between the palm and the TOF camera may be the shortest, and the depth of the point of the palm may be the smallest. The point with the smallest depth may be extracted and used as the point indicating the palm, which may usually be the point indicating the palm on the two-dimensional image based on the depth information. In addition, three points with the smallest depth may be extracted and the geometric center of the three points may be determined as the point indicating the palm. Further, all the points within the predetermined depth range connected with the point indicating the palm may be extracted, where all the connected points may be extracted using a flood fill algorithm. In addition, the predetermined depth range may be selected by a person skilled in the art based on the actual needs (for example, the predetermined depth range may be selected to be (0, 40 cm)), and is not specifically limited herein.

In some embodiments, a point set indicating the arm may be deleted from the connected point set, and the remaining point set may be determined as the point set indicating the palm. More specifically, the point set indicating the arm is usually included in the connected point set, and the point set indicating the arm should be deleted. As shown in FIG. 4, after acquiring the connected point set, a minimum circumscribed rectangle 401 of the connected point set may be obtained, and the distance between the points in the connected point set and a designated side of the circumscribed rectangle may be determined. The points whose distances do not a predetermined distance requirement may be determined to be the points indicating the arm, that is, the point whose distances do not meet the predetermined distance may be deleted as the points indicating the arm, and the remaining point set may be the point set indicating the palm.

As shown in FIG. 4, in some embodiments, the predetermined distance requirement may be determined by the side length of the minimum circumscribed rectangle. More specifically, take the long side of the rectangle as w and the short side of the rectangle as h. For example, the designated side may be the lower short side, and the distance $d_i$ from the points in the point set of the two-dimensional image indicating the palm to the lower short side may be calculated. If $d_i < w - 1.2h$, then the points may be determined as the points indicating the arm. In this way, all the points indicating the two-dimensional image of the arm may be deleted, and the remaining points may be the point set indicating the two-dimensional image of the palm. A hypothesis is used here, that is, h may represent the width of the palm on the two-dimensional image. Based on the ratio of the width of the palm to the length of the palm, 1.2 h may be determined as the length of the palm, and the difference between w and 1.2 h should be the maximum distance from the points on the arm to the lower short side. If the distance from a point in the point set of the two-dimensional image to the lower short side is less than or equal to the maximum distance, then the point may belong to the arm. In particular, $d_i < w - 1.2h$ is only one implementation method for determining the predetermined distance requirement based on the side length of the minimum circumscribed rectangle. Other methods may be selected by those skilled in the art and is not specifically limited herein.

In some embodiments, the gesture may be determined based on a plurality of distribution characteristics of the point set indicating the two-dimensional image of the palm.

In some embodiments, a distribution area may be determined based on the point set indicating the two-dimensional image of the palm, and the distribution characteristics of the point set may be determined based on the distribution area.

In some embodiments, a polygonal area may be used to cover the distribution area, a non-overlapping area between the polygonal area and the distribution area may be determined, and the distribution characteristics of the distribution area may be determined based on the non-overlapping area. In some embodiments, a farthest distance from a point in the non-overlapping area to a side of the corresponding polygon may be determined, and the distance may be determined as a distribution characteristic of the distribution area.

In some embodiments, when the farthest distance corresponding to each side of the polygon is less than or equal to the predetermined distance threshold, the gesture may be determined to be a fist. Further, when one or more of the farthest distances corresponding to polygon is greater than or equal to the predetermined distance threshold, the gesture may be determined to be a stretched palm.

In some embodiments, the point set of the two-dimensional image indicating of the user's palm corresponding to each frame of the depth image in the plurality frames of depth image may be determined, and the point cloud indicating the palm corresponding to each frame of the depth image may be determined based on the point set indicating the user's palm corresponding to each frame of image.

Further, the location information of the palm may be determined based on the point cloud indicating the palm, and a dynamic gesture of the palm may be determined based on a sequence of the location information. More specifically, since the three-dimensional coordinates of each point cloud may have a one-to-one correspondence with the two-dimensional coordinates of the points on the two-dimensional image, and the two coordinates are always stored in the process of gesture recognition, after acquiring the point set of the two-dimensional image indicating the user's palm, the point set indicating the palm may be determined. After acquiring the point cloud indicating the user's palm, the gesture of the user may be recognized based on the above-mentioned method.

In some embodiments, the movement directions of the palm motion corresponding to the location information in the sequence may be determined based on a sequence indicating the location information of the palm, and the gesture may be determined based on the sequence composed of the movement directions.

In some embodiments, a ratio of each of the movement directions may be determined and the movement of the palm may be determined based on the combination of the ratios.

In some embodiments, the velocity direction corresponding to the location information may be determined based on a sequence indicating the location information of the palm, and the sequence of movement directions may be determined based on the sequence of the velocity direction.

In some embodiments, the velocity direction corresponding to the location information in the sequence may be determined, an angle between the velocity direction and each of the plurality of predetermined directions may be determined, and the movement directions may be determined based on the angles.

In some embodiments, a first predetermined direction having the smallest angle with the velocity direction may be determined from the predetermined directions, and the first predetermined direction may be determined as the movement direction corresponding to the velocity direction.

In some embodiments, the location information of the palm may be determined based on the point cloud indicating the palm, and a dynamic gesture of the palm may be determined based on the location information sequence. The method may include determining the location information of the palm based on the point cloud indicating the palm, and determining a tick gesture of the palm based on the sequence composed of the location information. For the specific method for recognizing the tick gesture, please refer to the foregoing sections, and the details will not be described herein again.

Based on the recognition method provided in FIG. 10, the point set of the two-dimensional image of the palm may be acquired. All relevant explanations of determining the user's gesture (static gestures) based on the point set of the two-dimensional image indicating the palm may refer to the relevant portions in FIG. 2. In addition, the point cloud indicating the palm may be acquired based on the point set of the two-dimensional image indicating the palm. All relevant explanations of determining the user's gesture (dynamic gestures) based on the point cloud of the two-dimensional image indicating the palm may refer to the relevant portions in FIG. 2. For the sake of brevity, these explanations will not be repeated herein.

The embodiment of the present disclosure provides a computer storage medium having computer executable instructions stored therein. The computer executable instructions stored in the computer storage medium may be executed to perform the above recognition method.

Figure 11:
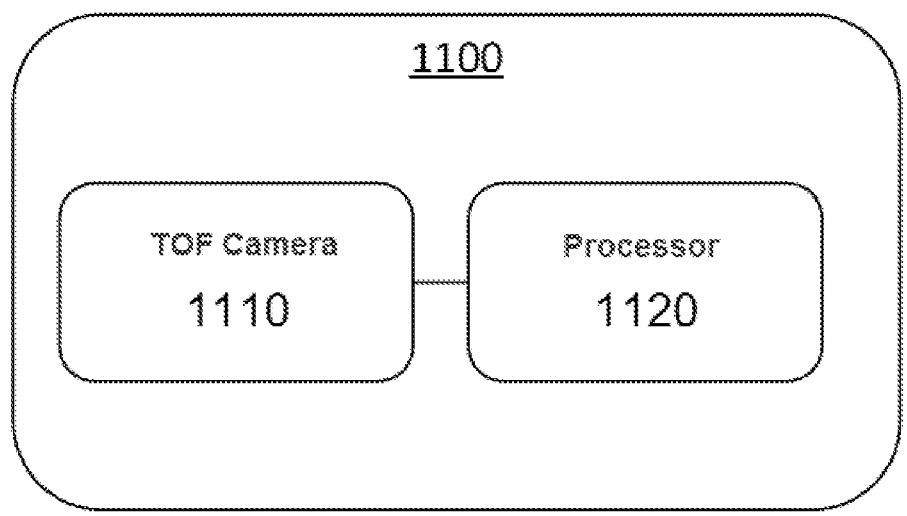
FIG. 11 is a schematic diagram of a recognition device according to an embodiment of the present disclosure.

As shown in FIG. 11, an embodiment of the present disclosure provides a gesture recognition device. The device 1100 includes:

A TOF camera 1110, which may be used to acquire a depth image of a user.

A processor 1120, which may be used to determine a plurality of point clouds corresponding to the depth image, categorize the point clouds, determined the point cloud indicating a palm from the categorized point clouds, and determine the gesture based on the point cloud indicating the palm.

In some embodiments, the processor 1120 may be specifically used to obtain a plurality of clusters of the point clouds from categorizing the point clouds and determined the point cloud indicating the palm from one of the plurality of clusters.

In some embodiments, the processor 1120 may be specifically used to determine a cluster of the point clouds indicating a hand from the plurality of clusters based on depth information and determine the point cloud indicating the palm from the cluster of the point clouds indicating the hand.

In some embodiments, the processor 1120 may be specifically used to obtain an average depth of each of the plurality clusters and determine the cluster with the smallest average depth as the cluster of point clouds indicating the hand.

In some embodiments, the processor 1120 may be specifically used to delete a point cloud indicating an arm from the cluster of the point clouds indicating the hand and determine the remaining cluster of the point clouds as the point cloud indicating the palm.

In some embodiments, the processor 1120 may be specifically used to extract a point with the smallest depth from the cluster of the point clouds indicating the hand, determine a distance between the cluster of the point clouds and the point with the smallest depth, determine the points whose distance is greater than or equal to a distance threshold as the point cloud indicating the arm, and delete the point cloud indicating the arm.

In some embodiments, the processor 1120 may be specifically used to determine a point set indicating a two-dimensional image indicating the hand based on the cluster of the point clouds indicating the hand and determine a minimum circumscribed rectangle of the point set of the two-dimensional image indicating the hand.

In some embodiments, the processor 1120 may be specifically used to determine a plurality of distances from the points in the point set of the two-dimensional image indicating the hand to a designated side of the minimum circumscribed rectangle and determine the points whose distances do not meet a predetermined distance requirement as the points of the two-dimensional image indicating the arm.

In some embodiments, the processor 1120 may be specifically used to determine a point set of the two-dimensional image indicating the arm, determine the point cloud indicating the arm based on the point set of the two-dimensional image indicating the arm, and delete the point cloud indicating the arm.

In some embodiments, the predetermined distance requirement may be determined based on a side length of the minimum circumscribed rectangle.

In some embodiments, the processor 1120 may be specifically used to acquire the point set of the two-dimensional image of the palm based on the point cloud indicating the user's palm, determine a distribution characteristic of the point set, and determine the gesture based on the distribution characteristic.

In some embodiments, the processor 1120 may be specifically used to determine a distribution area of the point set of the two-dimensional image indicating the palm and determine the distribution characteristic of the point set based on the distribution area.

In some embodiments, the processor 1120 may be specifically used to use a polygonal area to cover the distribution area, determine a plurality of non-overlapping areas between the polygonal area and the distribution area, and determine the distribution characteristic of the point set based on the non-overlapping areas.

In some embodiments, the processor 1120 may be specifically used to use a convex polygonal area with the least number of sides to cover the distribution area.

In some embodiments, the processor 1120 may be specifically used to determine a plurality of farthest distances from the points in the non-overlapping areas to the side the corresponding polygon and determine the farthest distances as the distribution characteristic of the point set.

In some embodiments, the processor 1120 may be specifically used to determine the gesture may be a first when the farthest distances corresponding to each of the non-overlapping areas is less than or equal to the distance threshold.

In some embodiments, the processor 1120 may be specifically used to determine the gesture may be a stretched palm when one or more of the farthest distances corresponding to the non-overlapping areas are greater than or equal to the distance threshold.

In some embodiments, the processor 1120 may be specifically used to use a clustering algorithm to categorize the point clouds.

In some embodiments, when categorizing the point clouds using the clustering algorithm, the number of clusters in the clustering algorithm may be adjustable.

In some embodiments, the processor 1120 may be specifically used to adjust the number of clusters based on a degree of dispersion between clusters.

In some embodiments, the TOF camera 1110 may be used to acquire a plurality of frames of the depth image of the user.

In some embodiments, the processor 1120 may be specifically used to determine the point cloud corresponding to each frame in the plurality frames of the depth image.

In some embodiments, the processor 1120 may be specifically used to categorize the point clouds corresponding to each frame of the depth image and determine the point cloud indicating the palm corresponding to each frame of the depth image from the categorized point clouds.

In some embodiments, the processor 1120 may be specifically used to determine location information of the palm corresponding to each frame of the depth image based on the point cloud indicating the user's palm corresponding to each frame of the depth image and determine the gesture of the palm based on a sequence of the location information.

In some embodiments, the processor 1120 may be specifically used to determine a plurality of movement directions of the palm corresponding to the sequence of the location information based on the sequence of location information indicating the palm and determine the gesture based on a sequence of the movement directions.

In some embodiments, the processor 1120 may be specifically used to determine a ratio of each of the movement directions in the sequence of the movement directions and determine the gesture based on the combination of the ratio.

In some embodiments, the processor 1120 may be specifically used to input the combination of the ratio into a predetermined computing model and determine the gesture based on the predetermined computing model.

In some embodiments, the processor 1120 may be specifically used to determine a plurality of velocity directions corresponding to the location information based on the sequence of the location information indicating the palm and determine the movement directions of the palm based on the velocity directions.

In some embodiments, the processor 1120 may be specifically used to determine the velocity directions corresponding to the sequence of the location information, determine a plurality of angles between the velocity directions and each of a plurality of predetermined directions, and determine the movement directions based on the angles.

In some embodiments, the processor 1120 may be specifically used to determine a predetermined first direction having the smallest angle with the velocity directions from the predetermined directions and determine the first predetermined direction as the movement direction corresponding to the velocity direction.

In some embodiments, the recognition device described in the embodiments of the present disclosure may perform the recognition method provided in the embodiments of the present disclosure in FIG. 2. Reference may be made to the corresponding description of the recognition method provided on FIG. 2 for the specific explanations and details are not described herein again. In addition, the recognition device described in the embodiments of the present disclosure can refer to and combine with the technical features in the recognition method provided in the embodiments of the present disclosure in FIG. 2.

As shown in FIG. 11, an embodiment of the present disclosure provides another gesture recognition device. The device 1100 includes:

A TOF camera 1110, which may be used to acquire a depth image of a user.

A processor 1120, which may be used to determine a point set of a two-dimensional image indicating a palm based on depth information and determine the gesture based on the point set.

In some embodiments, the processor 1120 may be specifically used to determine a point indicating the palm on the two-dimensional image based on the depth information, determine a point set connected with the point indicating the palm based on a predetermined depth range, and determine the point set of the two-dimensional image indicating the palm from the connected point set.

In some embodiments, the processor 1120 may be specifically used to delete a point set indicating an arm from the connected point set and the remaining point set may be determined as the point set indicating the palm.

In some embodiments, the processor 1120 may be specifically used to obtain a minimum circumscribed rectangle of the connected point set, determines a plurality of distances from the points in the connected point set to a designated side of the circumscribed rectangle, determine the points that do not meet a predetermined distance requirement as the points indicating the arm, and delete the points indicating the arm.

In some embodiments, the predetermined distance requirement may be determined based on a side length of the minimum circumscribed rectangle In some embodiments, the processor 1120 may be specifically used to determine a distribution characteristic of the point set and determine the gesture based on the distribution characteristic.

In some embodiments, the processor 1120 may be specifically used to determine a distribution area of the point set of the two-dimensional image indicating the palm and determine the distribution characteristic of the point set based on the distribution area.

In some embodiments, the processor 1120 may be specifically used to use a polygonal area to cover the distribution area, determine a plurality of non-overlapping areas between the polygonal area and the distribution area, and determine the distribution characteristic of the point set based on the non-overlapping areas.

In some embodiments, the processor 1120 may be specifically used to use a convex polygonal area with the least number of sides to cover the distribution area.

In some embodiments, the processor 1120 may be specifically used to determine a plurality of farthest distances from the points in the non-overlapping areas to a corresponding side of the polygon and determine the farthest distances as the distribution characteristic of the point set.

In some embodiments, the processor 1120 may be specifically used to determine the gesture may be a first when the farthest distances corresponding to each of the non-overlapping areas is less than or equal to the distance threshold.

In some embodiments, the processor 1120 may be specifically used to determine the gesture may be a stretched palm when one or more of the farthest distances corresponding to the non-overlapping areas are greater than or equal to the distance threshold.

In some embodiments, the TOF camera 1110 may be used to acquire a plurality of frames of the depth image of the user.

In some embodiments, the processor 1120 may be specifically used to determine the point set of the two-dimensional image indicating the palm corresponding to each frame of the plurality of frames of the depth image, determine a point cloud indicating the palm corresponding to each frame of the depth image based on the point set of the two-dimensional image indicating the palm corresponding to each frame of the depth image, determine location information of the palm based on the point cloud indicating the palm, and determine the gesture based on a sequence of the location information.

In some embodiments, the processor 1120 may be specifically used to determine a plurality of movement directions of the palm corresponding to the sequence of the location information based on the sequence of location information indicating the palm and determine the gesture based on a sequence of the movement directions.

In some embodiments, the processor 1120 may be specifically used to determine a ratio of each of the movement directions in the sequence of the movement directions and determine the gesture based on the combination of the ratio.

In some embodiments, the processor 1120 may be specifically used to input the combination of the ratio into a predetermined computing model and determine the gesture based on the predetermined computing model.

In some embodiments, the processor 1120 may be specifically used to determine a plurality of velocity directions corresponding to the location information based on the sequence of the location information indicating the palm and determine the movement directions of the palm based on the velocity directions.

In some embodiments, the processor 1120 may be specifically used to determine the velocity directions corresponding to the sequence of the location information, determine a plurality of angles between the velocity directions and each of a plurality of predetermined directions, and determine the movement directions based on the angles.

In some embodiments, the processor 1120 may be specifically used to determine a predetermined first direction having the smallest angle with the velocity directions from the predetermined directions and determine the first predetermined direction as the movement direction corresponding to the velocity direction.

In some embodiments, the recognition device described in the embodiments of the present disclosure may perform the recognition method provided in the embodiments of the present disclosure in FIG. 2. Reference may be made to the corresponding description of the recognition method provided on FIG. 2 for the specific explanations and details are not described herein again. In addition, the recognition device described in the embodiments of the present disclosure can refer to and combine with the technical features in the recognition method provided in the embodiments of the present disclosure in FIG. 10.

Figure 12:
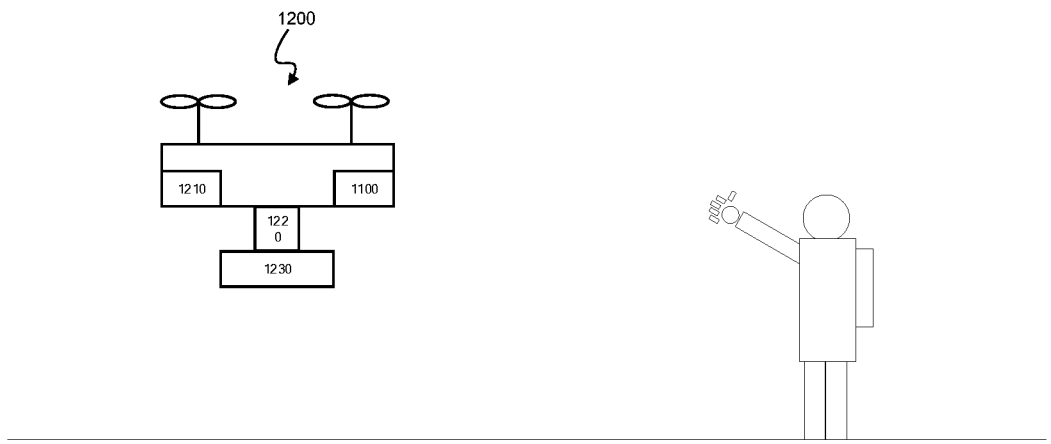
FIG. 12 is a schematic diagram of a mobile platform according to an embodiment of the present disclosure; and, FIG. 13 is a schematic diagram of a communication between a mobile platform and a control terminal according to an embodiment of the present disclosure.

As shown in FIG. 12, an embodiment of the present disclosure further provides a mobile platform. The mobile platform 1200 includes:

The recognition device 1100 as described above, the recognition device 1100 may be used to recognize a gesture.

A processor 1210, which may be used to generate a control instruction corresponding to the gesture recognized by the recognition device 1100 and control the mobile platform 1200 based on the control instruction.

In particular, the mobile platform 1200 may include an Unmanned Aerial Vehicle (UAV), a ground robot, a remote-controlled vehicle, etc. As shown in FIG. 12, the mobile platform 1200 is schematically illustrated as an UAV as the mobile platform and the UAV mentioned in the following sections may be replaced with a mobile platform. The recognition device 1100 may be mounted at a suitable location on the UAV. In particular, the recognition device may be mounted on the outside of the UAV, or may be built into the body of the UAV, and is not specifically limited herein. For example, the recognition device may be mounted in the nose portion of the UAV. The recognition device 1100 may detect an object within a detection range, acquire the palm of the user, and determine the gesture of the user. Each gesture may correspond to a different control instruction and the processor 1210 may control the UAV based on the generated control instruction. Further, the UAV may further include a PTZ platform 1220 and an imaging device 1230. The imaging device 1230 may be mounted on a main body of the UAV through the PTZ platform 1220. The imaging device 1230 may be used for image or video shooting during the flight of the UAV, and the imaging device 1230 may include but is not limited to a multi-spectral imager, a hyperspectral imager, a visible light camera, an infrared camera, etc. Furthermore, the PTZ platform 1220 may be a multi-axis transmission and stabilization system. A PTZ motor may compensate the shooting angle of the imaging device 1230 by adjusting the rotation angle of a rotating shaft and prevent or reduce the vibration of the imaging device 1230 by using a proper buffer mechanism. For the convenience of explanation, a gesture capable of generating the control command may be referred to as an instructing gesture.

The mobile platform provided in the embodiment of the present disclosure is capable of recognizing a gesture of a user and generating a corresponding control instruction base on the user's gesture, thereby controlling the mobile platform. The user may control the mobile platform through gestures, which may further enrich the operating method of the mobile platform, reduce the professional requirements for the user, and improve the fun of operating the mobile platform.

In some embodiments, after the recognition device 1100 recognizes the gesture of the user, the processor 1210 may be used to illuminate an indicator light on the mobile platform based on a predetermined control mode. More specifically, after the recognition device on the UAV recognizes the user's gesture, the indicator light on the UAV may be illuminated based on the predetermined control mode. For example, after successfully recognizing the gesture, a left navigation light and a right navigation light on the UAV may flash slowly, so the user may know whether the gesture made was recognized or not by observing the flashing condition of the navigation lights. Therefore, avoiding the user repeating the same gesture over and over because the user is unsure whether the gesture has been recognized. In addition, when the user's gesture is not successfully recognized, the recognition device may continue to detect the user's palm and the recognition process.

In some embodiments, after the indicator light of the mobile platform is illuminated, the recognition device 1100 may recognize a confirmation gesture of the user. Further, the processor 1210 may control the mobile platform based on the control instruction after the recognition device 1100 recognized the confirmation gesture. More specifically, by observing the flashing condition of the indicator light of the UAV, the user may know that gesture made has been recognized. In order to present a false triggering, the user may need to confirm the previously made gesture. After the user sees the indicator light of the UAV flashing, a confirmation gesture may be made. After the recognition device on the UAV successfully recognizes the confirmation gesture of the user, the processor may generate a control instruction based on the previous instructing gesture, and control the UAV based on the control instruction. Furthermore, if the recognition device does not recognize the confirmation gesture within a predetermined time period, the recognition device may return to detect the palm within the detection range to recognize the user's other instructing gestures.

Figure 13:
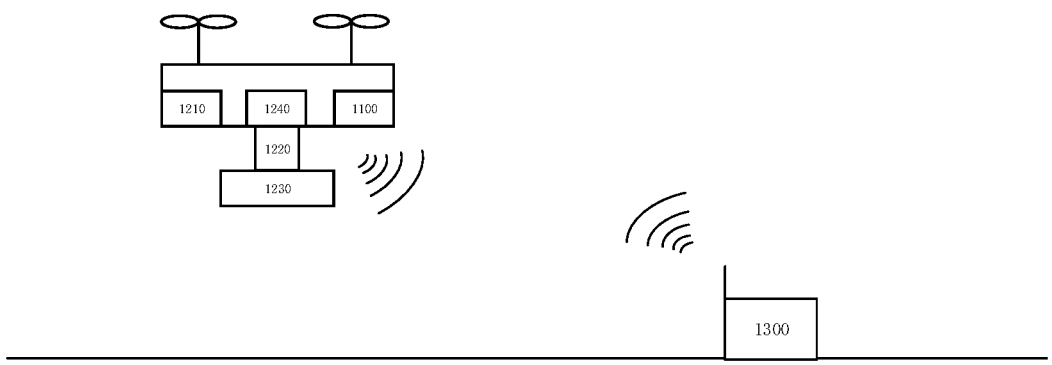

In some embodiments, the mobile platform may further include a communication interface 1240. The communication interface 1240 may be used to receive an instruction to stop recognizing the gesture. When the communication interface 1240 receives the instruction to stop recognizing the gesture, the processor 1210 may control the recognition device 1100 to stop recognizing the user's gesture. FIG. 13 is a schematic diagram of a communication between a mobile platform and a control terminal according to an embodiment of the present disclosure. As shown in FIG. 13, more specifically, the user can issue a control instruction to the mobile platform through the control terminal 1300, the control instruction may cause the UAV to exit a gesture control mode. At this point, the recognition device 1100 may no longer recognize the user's gesture. In addition, the communication interface 1240 may further receive an instruction to start recognizing the gesture. When the communication interface 1240 receives the instruction to start recognizing the gesture, the processor 1210 may control the recognition device 1100 to start recognizing the user's gesture.

In particular, the storage in the present disclosure may include a volatile memory, such as a random-access memory (RAM). The storage may further include a non-volatile memory, such as a flash memory, a hard disk drive (HDD), a solid-state drive (SSD), etc.

The processor may be a central processing unit (CPU). The processor may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), etc.

The embodiments in this specification are described in a progressive manner, each embodiment emphasizes a difference from the other embodiments, and the identical or similar parts between the embodiments may be made to reference each other. Since the apparatuses disclosed in the embodiments are corresponding to the methods disclosed in the embodiments, the description of the apparatuses is simple, and relevant parts may be made to reference the description of the methods.

Persons skilled in the art may further realize that, units and steps of algorithms according to the description of the embodiments disclosed by the present invention can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The recognition method and apparatus, mobile platform, and the computer storage medium provided in the embodiments of the present disclosure are described in detail above. The principle and the embodiments of the present invention are explained in combination with particular embodiments, which are intended to help understand the method and the core concept of the present invention. It should be noted that, improvements and modifications can be made by those skilled in the art without departing from the scope of the present invention. These improvements and modifications should fall within the protection scope defined by the claims of the present invention.

What is claimed is:

1. A gesture recognition method, comprising:
acquiring a plurality of frames of depth image of a user;
determining a point set of a two-dimensional image indicating a palm corresponding to each frame of depth image of the plurality of frames of depth image based on depth information of each frame of depth image, including:
clustering point sets of the two-dimensional image based on the depth information; and
determining the point set indicating the palm based on the clustered point sets and a distance threshold;

determining a point cloud, associated with a three-dimensional space, indicating the palm corresponding to each frame of depth image based on a coordinate correspondence between the point set and the point cloud and the point set indicating the palm; and determining a gesture based on at least one of the point set or the point cloud, including:

obtaining trajectory information of a movement of the palm in a period of time, the trajectory information containing a sequence of movement directions of the palm during the movement of the palm, the sequence of movement directions is generated based on the at least one of the point set or the point cloud;

determining a ratio of each movement direction in the sequence of movement directions to obtain a sequence of ratios; and determining the gesture based on the sequence of ratios.

2. The method of claim 1, wherein determining the point set of the two-dimensional image indicating the palm based on the depth information further includes:

determining a point indicating the palm corresponding to each frame of depth image of the plurality of frames of depth image on the two-dimensional image based on the depth information of each frame of depth image;

determining a point set connected with the point indicating the palm based on a depth range; and determining the point set of the two-dimensional image indicating the palm from the connected point set.

3. The method of claim 2, wherein determining the point set of the two-dimensional image indicating the palm from the connected point set includes:

deleting a point set indicating an arm from the connected point set; and determining the point set indicating the palm based on a remaining point set.

4. The method of claim 3, wherein deleting the point set indicating the arm from the connected point set and determining the point set indicating the palm based on the remaining point set includes:

obtaining a minimum circumscribed rectangle of the connected point set;

determining a plurality of distances from points in the connected point set to a designated side of the circumscribed rectangle;

determining points not meeting a distance requirement to be points indicating the arm; and deleting the points indicating the arm.

5. The method of claim 4, wherein the distance requirement is determined based on a side length of the minimum circumscribed rectangle.

6. The method of claim 1, wherein determining the gesture based on the at least one of the point set or the point cloud further includes:

determining a distribution characteristic of the point set; and determining the gesture further based on the distribution characteristic.

7. The method of claim 6, wherein determining the distribution characteristic of the point set includes:

determining a distribution area of the point set of the two-dimensional image indicating the palm; and determining the distribution characteristic of the point set based on the distribution area.

8. The method of claim 7, wherein determining the distribution characteristic of the point set based on the distribution area includes:

using a polygonal area to cover the distribution area;

determining a plurality of non-overlapping areas between the polygonal area and the distribution area; and determining the distribution characteristic of the point set based on the non-overlapping areas.

9. The method of claim 8, wherein using the polygonal area to cover the distribution area includes:

using a convex polygonal area with a least number of sides to cover the distribution area.

10. The method of claim 8, wherein determining the distribution characteristic of the point set based on the non-overlapping areas includes:

determining a plurality of farthest distances from the points in the non-overlapping areas to a corresponding side of the polygon; and determining the farthest distances to be the distribution characteristic of the point set.

11. The method of claim 10, wherein determining the distribution characteristic of the point set based on the non-overlapping areas further includes:

determining the gesture to be a first in response to the farthest distances corresponding to each of the non-overlapping areas being less than or equal to the distance threshold.

12. The method of claim 10, wherein determining the distribution characteristic of the point set based on the non-overlapping areas further includes:

determining the gesture to be a stretched palm in response to one or more of the farthest distances corresponding to the non-overlapping areas being greater than or equal to the distance threshold.

13. The method of claim 2, wherein determining the gesture based on the at least one of the point set or the point cloud further includes:

determining location information of the palm based on the point cloud indicating the palm to determine a sequence of location information indicating the palm.

14. The method of claim 13, wherein determining the gesture of the palm further includes:

determining the movement directions of the palm based on the sequence of location information.

15. The method of claim 14, wherein determining the gesture based on the sequence of ratios includes:

determining the gesture based on a combination of the ratios in the sequence of ratios.

16. The method of claim 15, wherein determining the gesture based on the combination of the ratios includes:

inputting the combination of the ratio into a computing model; and determining the gesture based on the computing model.

17. The method of claim 14, wherein determining the movement directions of the palm includes:

determining a plurality of velocity directions corresponding to the location information based on the sequence of location information indicating the palm; and determining the movement directions of the palm based on the velocity directions.

18. The method of claim 17, wherein determining the movement directions of the palm based on the velocity directions includes:

determining the velocity directions corresponding to the sequence of location information;

determining a plurality of angles between the velocity directions and each of a plurality of predetermined directions; and determining the movement directions based on the angles.

19. The method of claim 18, wherein determining the movement directions based on the angles includes:

determining a first direction having a smallest angle with the velocity directions from the predetermined directions; and determining the first direction to be the movement direction corresponding to the velocity direction.

20. A gesture recognition device, comprising:

a TOF camera; and a processor configured to:

determine a point set of a two-dimensional image indicating a palm corresponding to each frame of depth image of a plurality of frames of depth image of a user, acquired by the TOF camera, based on depth information of each frame of depth image, including:

clustering point sets of the two-dimensional image based on the depth information; and determining the point set indicating the palm based on the clustered point sets and a distance threshold;

determine a point cloud, associated with a three-dimensional space, indicating the palm corresponding to each frame of depth image based on a coordinate correspondence between the point set and the point cloud and the point set indicating the palm; and determine a gesture based on at least one of the point set or the point cloud, including:

obtaining trajectory information of a movement of the palm in a period of time, the trajectory information containing a sequence of movement directions of the palm during the movement of the palm, the sequence of movement directions being generated based on the at least one of the point set or the point cloud;

determining a ratio of each movement direction in the sequence of movement directions to obtain a sequence of ratios;

and determining the gesture based on the sequence of ratios.

* * * * *